Aug. 18, 1970  W. C. WEST  3,524,508
ROW MARKER
Filed Dec. 16, 1966  2 Sheets-Sheet 2
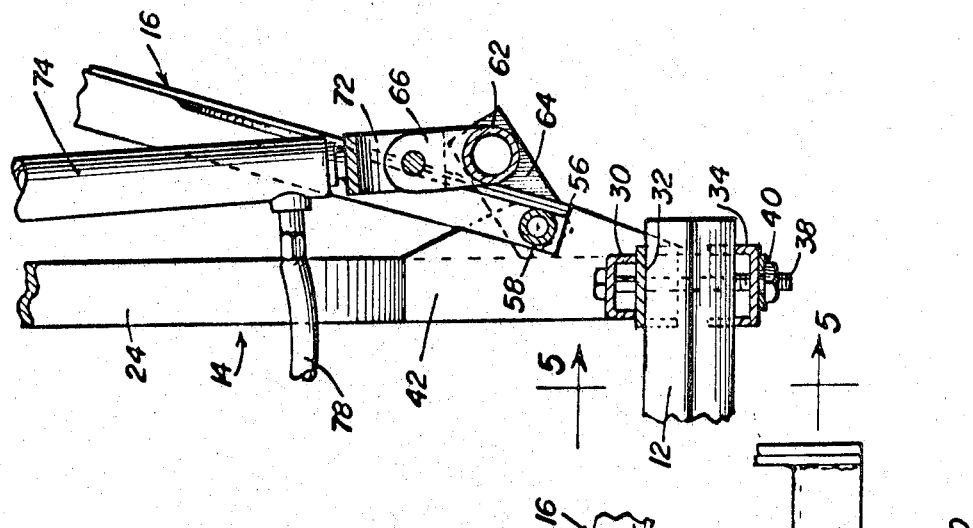
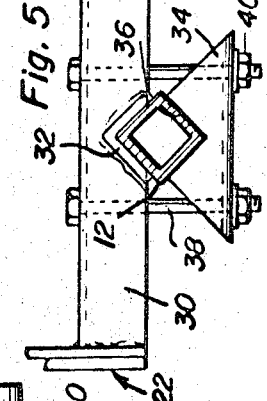
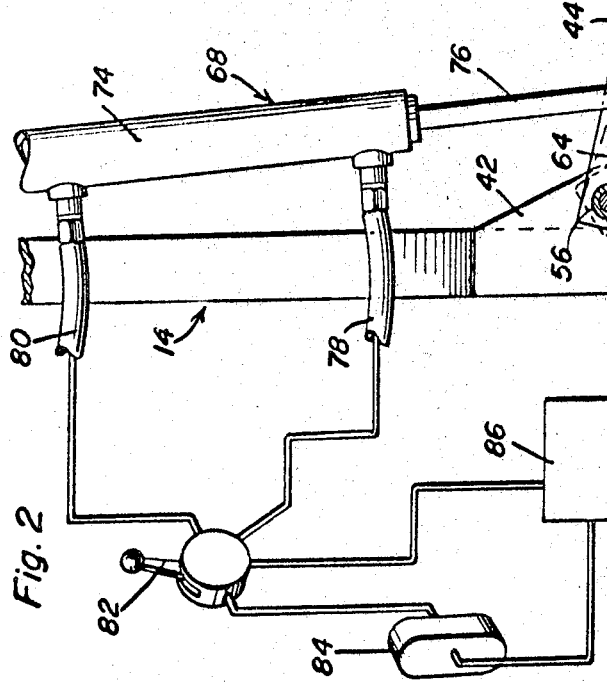
Wilbur C. West
INVENTOR.
BY Clarence A. O'Brien
and Harvey B. Jackson
Attorneys

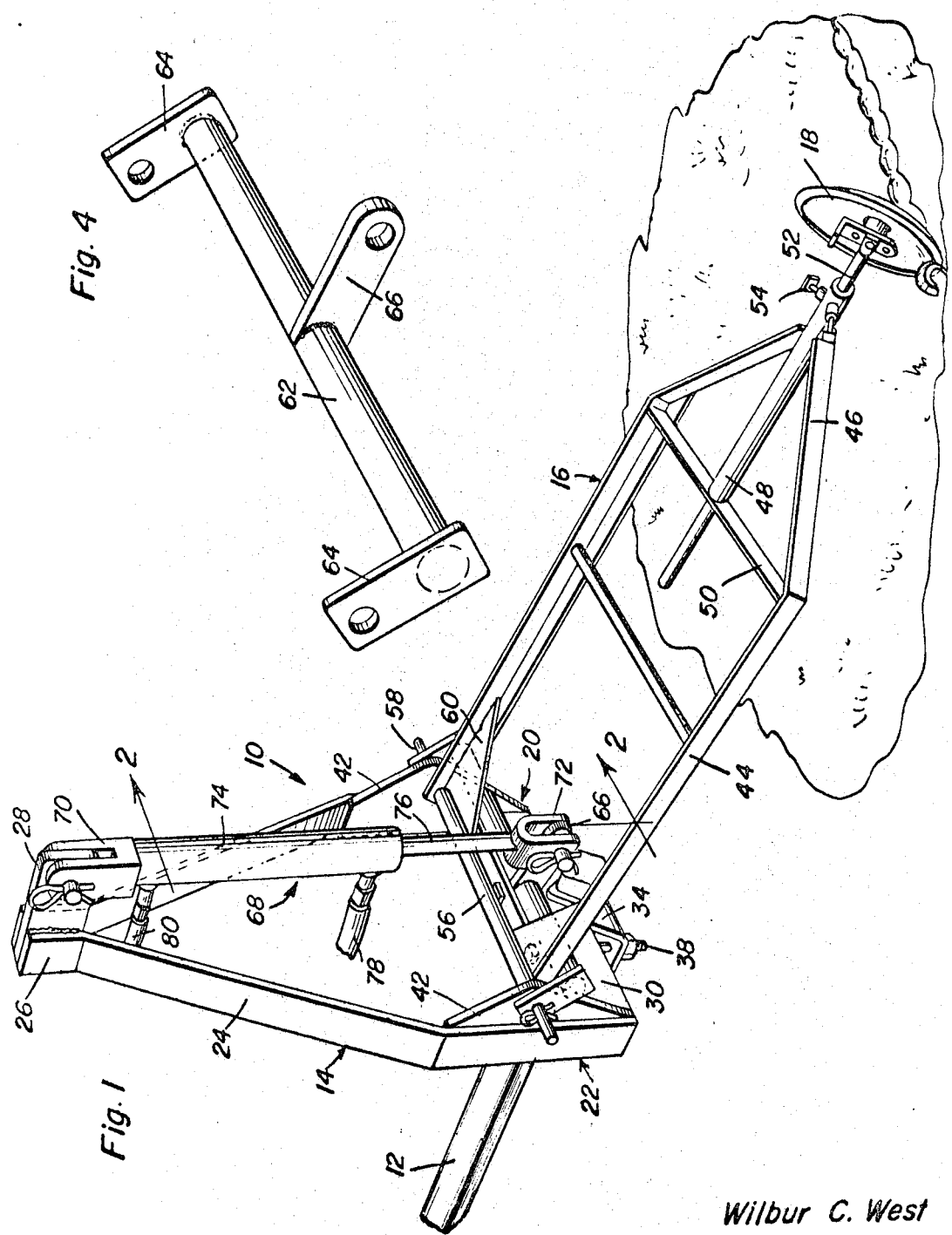

United States Patent Office 3,524,508
Patented Aug. 18, 1970

3,524,508
ROW MARKER
Wilbur C. West, P.O. Box 52, Pine Bluff, Ark. 71601
Filed Dec. 16, 1966, Ser. No. 602,390
Int. Cl. A01b *35/32*
U.S. Cl. 172—126                                3 Claims

ABSTRACT OF THE DISCLOSURE

A farm machine mounted device for defining a laterally spaced parallel guide mark. The device is mounted on an end of a tool bar and movable between an operative and inoperative position by means of a double-acting hydraulic cylinder.

---

The instant invention generally relates to farm or agricultural equipment, and is more particularly concerned with the provision of a row marker for such equipment.

As will be appreciated by those familiar with the art, row markers generally similar to the type herein involved are in common usage, such markers normally being provided in pairs secured to the opposite ends of the tool bar of a tractor carried or pulled agricultural machine. One such known device is as set forth in Pat. No. 3,250,333, issued to L. E. Day on May 10, 1966. It is the primary object of the instant invention to provide a row marker which constitutes a significant advance in the art and which incorporates structural modifications resulting in a superiorly operating device as compared to the devices heretofore known and in commercial usage.

One significant deficiency in the row markers of the type illustrated in the Day patent is the utilization of a single-acting hydraulic cylinder in controlling the movement of the marker arm. In such a system, the hydraulic cylinder is used solely for the purpose of raising the marker, with the lowering of the marker into operative position being under the influence of gravity upon the release of a retaining latch. However, in cold climates, or even in the early morning hours in milder climates, there is a tendency for the hydraulic oil in the system to thicken, this in turn greatly restricting the speed at which the marker arm lowers to operating position, and by the same token tending to inhibit the free up-and-down movement desired for the marker in its operative position. Accordingly, it is a highly significant object of the instant invention to provide a row marker which provides not only for an unrestricted lowering of the row marker into operative position regardless of weather conditions, but also provides for a free floating up-and-down movement of the marker in the operative position. This is basically achieved through the utilization of a double-acting hydraulic cylinder in conjunction with a lift frame which is both capable of positively engaging the marker arm during the raising thereof, and completely disengaging with the marker arm in its lowered operative position, the actual lowering of the arm through the positive action of the double-acting hydraulic cylinder, being effected rapidly and positively.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of the row marker of the instant invention mounted on the end of a tool bar and orientated in operative position;

FIG. 2 is a partial cross-sectional view taken substantially on a plane passing along line 2—2 of FIG. 1 with the control elements schematically incorporated;

FIG. 3 is a cross-sectional view similar to FIG. 2 with the row marker in inoperative position;

FIG. 4 is an enlarged perspective view of a portion of the marker arm positioning structure; and FIG. 5 is a cross-sectional view taken substantially on a plane passing along line 5—5 in FIG. 3 and illustrating the mounting arrangement for the row marker.

Referring now more specifically to the drawings, reference numeral 10 is used to generally designate the row marker comprising the instant invention. This row marker 10, normally utilized in pairs mounted on the opposite ends of a tool bar 12 or the like, basically incorporates a mounting frame 14, an arm or frame 16 pivotally mounted on the mounting frame and carrying the marking element or disk 18 at the outer end thereof, and a control system 20 for effecting the movement of the arm 16 between an operative and inoperative position.

The mounting frame 14 includes a pair of vertically extending laterally spaced rigid side bars 22, the upper portions 24 of which converge upwardly toward each other and terminate in an apex portion 26 whereat a forwardly projecting mounting ear 28 is rigidly affixed. The lower ends of the mounting frame side bars 22 are rigidly interconnected by a transversely extending inverted channel-shaped mounting bar 30 which includes a centrally located V-shaped notch reinforced by an inverted angle piece 32 welded therein. This angle piece reinforced V-shaped notch seats over the top of the tool bar 12, the mounting frame being positioned vertically thereabove and transversely thereacross as will be apparent from the drawings. The actual clamping of the mounting frame 14 to the tool bar 12 is completed by means of an upwardly directed clamping bar 34, also including a central tool bar receiving seat or notch 36, engaged with the undersurface of the tool bar 12 and bolted to the mounting frame mounting bar 30 by a pair of elongated bolts 38 located to the opposite sides of the tool bar 12. Suitable nuts 40 and washers will of course be associated with each of the mounting bolts 38 as required. Finally, each of the mounting frame side bars has a forwardly projecting mounting plate 42 rigidly affixed, as by welding, to the vertically projecting lower portion thereof.

The pivotally mounted arm or frame 16 includes a pair of laterally spaced generally parallel members or bars 44 which, if deemed desirable for purposes of rigidity, may be in the nature of angle members or the like. The forward end portions 46 of these bars 44 converge toward each other and mount therebetween an elongated sleeve 48, the rear end portion of which is secured to a transversely extending brace 50, this brace 50 being one of the several such braces which can, if deemed desirable, be utilized between the bars 44. The sleeve 48 in turn mounts the elongated mounting shaft 52 of the marking element 18, the shaft 52 being selectively fixed within the sleeve 48 by suitable setscrew means 54 or the like.

The rear end of the arm 16 is pivotally mounted between the mounting plates 42 for movement in a vertical plane generally between the two positions illustrated in FIGS. 2 and 3. This pivotal mounting can be effected through the provision of a transversely extending sleeve 56 interconnecting, as through the utilization of welding means, the rear ends of the side bars 44, this sleeve 56, in conjunction with appropriate coaxial apertures through the associated ends of the bars 44, being received in a free rotatable manner on an elongated rod or axle 58 extending between and mounted on the forward portions of the mounting plates 42. Suitable bracing gussets 60 can be provided between the sleeve 56 and each of the side bars 44 as desired. With this construction, it will be appreciated that the arm or frame 16 is free to pivot between an upper or inoperative position generally paralleling the mounting frame 14, and a lower or operative position projecting generally perpendicularly outward from the mounting frame 14.

The control unit 20 which operatively moves the frame 16 between the raised and lowered positions thereof includes an elongated lift member or bar 62 positioned transversely across the inner end portion of the frame 16 below the bars 44 and generally forward of the point of pivotal engagement of these bars 44 with the mounting plates 42. The opposite ends of the member 62 have a pair of end plates 64 rigidly secured thereto, these end plates 64 in turn being rotatably mounted on the mounting plates 42, preferably coaxially with the sleeve 56 on the shaft 58 as illustrated in the drawings. A forwardly projecting ear or lug 66 is rigidly affixed, as by welding, to the lift member 62 at a central point therealong. Finally, a double-acting hydraulic cylinder and piston unit 68 is engaged between the upper mounting frame ear 28 and the lower lift bar ear 66 through a pair of pin and clevis units 70 and 72 secured to the outer ends of the cylinder 74 and piston 76.

With this control unit 20, it will be noted that in raising the frame 16 and marker 18 from its operative position, the hydraulic fluid will be introduced through the lower hydraulic line 78 so as to cause a retraction of the piston 76 into the cylinder 74 and an upward pivoting of the lift member 62 into engagement with the lower surfaces of the side bars 44 of the frame 16. The continued retraction of the piston 76 will result in an upward swinging of the frame 16 to the retracted or inoperative position of FIG. 3, the frame 16 of course pivoting freely about the shaft 58. Incidently, the lift member 62, as noted in the drawings, will preferably be cylindrical or tubular in shape.

When it is desired to lower the marking element 18 into ground-engaging contact, the appropriate hydraulic fluid is introduced through the upper hydraulic line 80 which effects a rapid, positive, and controlled extension of the piston 76, and a corresponding downward swinging of the lift member 62, the mounting frame 16 falling freely therewith. The downward movement of the frame 16 continues until the marking element 18 engages the ground, while the downward pivoting of the lift member 62 continues further so as to actually move away or below the ground-engaged frame 16 as will be best appreciated from FIG. 2. In this manner, through a positive spacing of the lift member 62 below the frame 16 when the outer end of the frame is supported on the ground, the frame 16 and marking element 18 are in effect free-floating so as to effectively follow variations in the ground contour without encountering any resistance from the control unit 20. This is particularly significant in that a continuous marking of the ground is ensured regardless of various dips or rises therein as may be encountered by the machine or the marking element 18 itself. Incidently, the cylinder and piston unit 68 will normally be associated with the conventionally provided hydraulic system on the propelling vehicle or tractor, this basically consisting of a control lever 82, pump 84 and reservoir 86.

As will be appreciated from the foregoing, the instant invention incorporates all of the advantages of the utilization of a hydraulic cylinder and piston unit for the raising of a row marker, while eliminating the disadvantages associated therewith by providing for a positive pressurized extension of the piston during the lowering operation, this in turn eliminating the normally experienced hydraulic resistance to a lowering of the marker arm and a free-floating thereof in its lowered operative position. Further, specific provision is made for the free-floating operation of the marker or marking element through the utilization of a lift member which completely disengages from the marker supporting frame upon the marking element coming into marking contact with the ground.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a tractor mounted tool bar, a row marker, a mounting frame on one end of said tool bar, an earth marking element, arm means mounted on said frame and projecting longitudinally outward of the tool bar so as to project laterally from the bar mounting tractor, means fixing said marking element to the outer end of said arm means, means pivotally mounting the inner end of said arm means on said mounting frame for pivotal movement about an axis transverse of the longitudinal axis of the tool bar between a lowered operative position and a raised inoperative position, and independent control means mounted on said mounting frame and selectively engageable with said arm means for effecting a controlled raising of said arm means from the lowered operative position to the raised inoperative position, and subsequently lowering the arm means from the raised inoperative position to the lowered operative position, said control means comprising a lift bar positioned transversely below the pivotally mounted end of said arm means in longitudinally spaced relation thereto, said lift bar being independent of said arm means and mounted for vertical movement both relative to and in conjunction with said arm means, and power means fixed between said mounting frame and said lift bar for effecting a selective powered raising and powered lowering of said lift bar and, through engagement of the lift bar with the arm means, the raising and lowering of said arm means, the arm means falling freely along with the powered lowering of said lift bar, said lift bar being positionable in spaced relation below the arm means in the lowered operative position of the arm means, said power means comprising a double-acting hydraulic cylinder and piston unit, the piston of said cylinder and piston unit being hydraulically extended and retracted relative to said cylinder.

2. The structure of claim 1 including means pivotally securing said lift bar to said mounting frame independently of said arm means for pivotal movement along the same general path as said arm means.

3. In combination with a tractor mounted tool bar, a row marker comprising a mounting structure on one end of said tool bar, a marking element outwardly spaced from said one end of the tool bar, support arm means extending longitudinally of the tool bar between said marking element and said mounting structure so as to project laterally of the bar mounting tractor, means fixing said marking element to the outer end of said arm means, means pivotally fixing the inner end of said arm means on said mounting structure for pivotal movement about an axis transverse of the longitudinal axis of the tool bar, a lift bar positioned transversely below and outward of the pivoted inner end of said arm means in independent unsecured relation to said arm means, and double-acting hydraulic cylinder and piston means operatively engaged between said mounting structure and said lift bar for effecting a hydraulically induced movement of said lift bar upward into supporting engagement with said arm means for movement of said arm means from a generally horizontal position to a generally vertical position upon a continued vertical movement of said lift bar, and a hydraulically induced movement of said lift bar downward in the opposite direction and a corresponding lowering of the supported arm means therewith from a substantially vertical position to a substantially horizontal position.

References Cited

UNITED STATES PATENTS

| | | | |
|---|---|---|---|
| 1,808,759 | 6/1931 | Bickerton | 172—464 |
| 2,616,348 | 11/1952 | Ariens | 172—112 X |
| 3,158,204 | 11/1964 | Martin | 111—33 X |
| 3,250,333 | 5/1966 | Day | 111—33 X |

ROBERT E. PULFREY, Primary Examiner

A. E. KOPECKI, Assistant Examiner

U.S. Cl. X.R.

172—501